US012725722B2

(12) United States Patent
Brittles et al.

(10) Patent No.: US 12,725,722 B2
(45) Date of Patent: Sep. 1, 2026

(54) TRANSPORT CURRENT SATURATED HTS MAGNETS

(71) Applicant: Tokamak Energy Ltd, Abingdon (GB)

(72) Inventors: Greg Brittles, Abingdon (GB); Robert Slade, Abingdon (GB); Rod Bateman, Abingdon (GB)

(73) Assignee: Tokamak Energy Ltd, Abingdon (GB)

(*) Notice: Subject to any disclaimer, the term of this patent is extended or adjusted under 35 U.S.C. 154(b) by 1395 days.

(21) Appl. No.: 17/435,774

(22) PCT Filed: Mar. 6, 2020

(86) PCT No.: PCT/GB2020/050531
§ 371 (c)(1),
(2) Date: Sep. 2, 2021

(87) PCT Pub. No.: WO2020/178594
PCT Pub. Date: Sep. 10, 2020

(65) Prior Publication Data

US 2022/0157501 A1 May 19, 2022

(30) Foreign Application Priority Data

Mar. 6, 2019 (GB) ...................................... 1902995
Jul. 18, 2019 (GB) ...................................... 1910268

(51) Int. Cl.
*H01F 6/00* (2006.01)
*H01F 6/04* (2006.01)
*H01F 6/06* (2006.01)

(52) U.S. Cl.
CPC ............... *H01F 6/008* (2013.01); *H01F 6/04* (2013.01); *H01F 6/06* (2013.01)

(58) Field of Classification Search
CPC ....................................................... H01F 6/008
See application file for complete search history.

(56) References Cited

U.S. PATENT DOCUMENTS 6,977,571 B1 12/2005 Hollis et al.
2004/0266628 A1 12/2004 Lee et al.
(Continued)

FOREIGN PATENT DOCUMENTS

CN 101895284 A 11/2010
CN 107064832 A 8/2017
(Continued)

OTHER PUBLICATIONS

Kim et al., "Experimental Study on Thermal Behavior of HTS Coils with Quasi-Insulatoin Winding Method at Overcurrent Operation", IEEE Transactions on Applied Superconductivity, 2016, vol. 26, No. 4, 5 pages.

(Continued)

*Primary Examiner* — Paul A Wartalowicz
(74) *Attorney, Agent, or Firm* — Michael Best & Friedrich LLP

(57) ABSTRACT

A high temperature superconducting, HTS, magnet system. The HTS magnet system comprises an HTS field coil, a temperature control system, a power supply, and a controller. The HTS field coil comprises a plurality of turns comprising HTS material; and a resistive material electrically connecting the turns, such that current can be shared radially between turns via the resistive material. The temperature control system is configured to control the temperature of the coil, the temperature control system comprising at least a cryogenic cool system configured to keep the coil below a self-field critical temperature of the HTS material. The power supply is configured to supply current to the HTS field coil. The controller is configured to cause the power supply to provide a current greater than a critical current of all of the HTS material.

17 Claims, 4 Drawing Sheets

(56) References Cited

U.S. PATENT DOCUMENTS

| | | | | | |
|---|---|---|---|---|---|
| 2010/0045293 | A1* | 2/2010 | Ando | G01R 33/3806 | 324/318 |
| 2011/0082043 | A1* | 4/2011 | Wang | H01F 6/06 | 324/318 |
| 2015/0213930 | A1 | 7/2015 | Hahn et al. | | |
| 2017/0179364 | A1* | 6/2017 | Schwartz | H10N 60/80 | |
| 2019/0252104 | A1 | 8/2019 | Slade | | |
| 2019/0310332 | A1* | 10/2019 | Leussler | G01R 33/3858 | |

FOREIGN PATENT DOCUMENTS

| | | | |
|---|---|---|---|
| EP | 1895604 | A2 | 3/2008 |
| JP | WO2015111201 | A1 | 3/2017 |
| KR | 101372822 | B1 | 3/2014 |
| WO | 2013180802 | A1 | 12/2013 |

OTHER PUBLICATIONS

Korean Patent Office Action for Application No. 1020217031025 dated Apr. 18, 2024 29 pages including English machine translation).

Song et al., "Dynamic Response of No-Insulation and Partial-Insulation Coils for HTS Wind Power Generator", IEEE Transactions on Applied Superconductivity, vol. 25, Jun. 2015, (5 pages).

Chinese Patent Office Action for Related Application No. 202080018675.2 dated Jan. 13, 2023 (13 pages, Including an English translation).

International Search Report and Written Opinion for Application No. PCT/GB2020/050531 dated Jun. 9, 2020 (16 pages).

United Kingdom Intellectual Property Office Search Report for Application No. GB1902995.8 dated Aug. 28, 2019 (3 pages).

Song et al., "Dynamic Response of No-Insulation and Partial-Insulation Coils for HTS Wind Power Generator", IEEE Transactions on Applied Superconductivity, vol. 25, No. 3, 2015, pp.

Gyuraki et al., "Fluorescent thermal imagine of a non-insulated pancake coil wound from high temperature superconductor tape", <https://arxiv.org/abs/1903.09302>, 2019, 5 pages.

Yanagisawa et al., "Effect of coil current sweep cycle and temperature change cycle on the screening current-induced magnetic field for YbCo-coated conductor coils", Advances in Cryogenic Engineering, vol. 57, 2012, pp. 1373-1380.

* cited by examiner

TRANSPORT CURRENT SATURATED HTS MAGNETS

CROSS-REFERENCE TO RELATED APPLICATION(S)

This application is a national phase entry of PCT/GB2020/050531, filed on Mar. 6, 2020, which claims priority to GB 1902995.8, filed on Mar. 6, 2019, and Patent Application No. GB 1910268.0, filed on Jul. 18, 2019, the entire contents of each of which are fully incorporated herein by reference.

FIELD OF THE INVENTION

The present invention relates to high temperature superconducting, HTS, magnets. In particular, the present invention relates to methods of operating such magnets, and magnets implementing the methods.

BACKGROUND

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a self-field critical temperature (the temperature above which the material cannot be superconducting even in zero external magnetic field) below about 30K. The behaviour of HTS material is not described by BCS theory, and such materials may have self-field critical temperatures above about 30K (though it should be noted that it is the physical differences in composition and superconducting operation, rather than the self-field critical temperature, which define HTS and LTS material). The most commonly used HTS are "cuprate superconductors"—ceramics based on cuprates (compounds containing a copper oxide group), such as BSCCO, or ReBCO (where Re is a rare earth element, commonly Y or Gd). Other HTS materials include iron pnictides (e.g. FeAs and FeSe) and magnesium diborate ($MgB_2$).

ReBCO is typically manufactured as tapes, with a structure as shown in FIG. 1. Such tape 100 is generally approximately 100 microns thick, and includes a substrate 101 (typically electropolished hastelloy approximately 50 microns thick), on which is deposited by IBAD, magnetron sputtering, or another suitable technique a series of buffer layers known as the buffer stack 102, of approximate thickness 0.2 microns. An epitaxial ReBCO-HTS layer 103 (deposited by MOCVD or another suitable technique) overlays the buffer stack, and is typically 1 micron thick. A 1-2 micron silver layer 104 is deposited on the HTS layer by sputtering or another suitable technique, and a copper stabilizer layer 105 is deposited on the tape by electroplating or another suitable technique, which often completely encapsulates the tape.

The substrate 101 provides a mechanical backbone that can be fed through the manufacturing line and permit growth of subsequent layers. The buffer stack 102 is required to provide a biaxially textured crystalline template upon which to grow the HTS layer, and prevents chemical diffusion of elements from the substrate to the HTS which damage its superconducting properties. The silver layer 104 is required to provide a low resistance interface from the ReBCO to the stabiliser layer, and the stabiliser layer 105 provides an alternative current path in the event that any part of the ReBCO ceases superconducting (enters the "normal" state).

In addition, "exfoliated" HTS tape can be manufactured, which lacks a substrate and buffer stack, and instead has silver layers on both sides of the HTS layer. Tape which has a substrate will be referred to as "substrated" HTS tape.

HTS tapes may be arranged into HTS cables. An HTS cable comprises one or more HTS tapes, which are connected along their length via conductive material (normally copper). The HTS tapes may be stacked (i.e. arranged such that the HTS layers are parallel), or they may have some other arrangement of tapes, which may vary along the length of the cable. Notable special cases of HTS cables are single HTS tapes, and HTS pairs. HTS pairs comprise a pair of HTS tapes, arranged such that the HTS layers are parallel. Where substrated tape is used, HTS pairs may be type-0 (with the HTS layers facing each other), type-1 (with the HTS layer of one tape facing the substrate of the other), or type-2 (with the substrates facing each other). Cables comprising more than 2 tapes may arrange some or all of the tapes in HTS pairs. Stacked HTS tapes may comprise various arrangements of HTS pairs, most commonly either a stack of type-1 pairs or a stack of type-0 pairs and (or, equivalently, type-2 pairs). HTS cables may comprise a mix of substrated and exfoliated tape.

A superconducting magnet is formed by arranging HTS cables (or individual HTS tapes, which for the purpose of this description can be treated as a single-tape cable) into coils, either by winding the HTS cables or by providing sections of the coil made from HTS cables and joining them together. HTS coils come in three broad classes:

- Insulated, having electrically insulating material between the turns (so that current can only flow in the "spiral path" through the HTS cables).
- Non-insulated, where the turns are electrically connected radially, as well as along the cables
- Partially insulated, where the turns are connected radially with a controlled resistance, either by the use of materials with a high resistance (e.g. compared to copper), or by providing intermittent insulation between the coils.

Non-insulated coils could also be considered as the low-resistance case of partially insulated coils.

In the following discussion a magnet is defined as comprising a number of HTS coils connected in series. There will be resistive joints between the coils. The coils themselves may be fully superconducting, or, if constructed from cables comprising multiple lengths of individual HTS tape connected in series and in parallel, they may have a small but non-zero resistance. The magnet will therefore have an inductance L, defined by its geometry, stored energy and number of turns, and a residual resistance, R. The characteristic charging time constant of the magnet is therefore L/R.

Energising or charging a non-insulated or partially insulated HTS magnet is more complex than energizing a fully insulated coil as the current can take two paths, either around the spiral high inductance path, or through the radial low inductance path. The spiral path has negligible resistance when the coil is fully superconducting, whilst the radial path is resistive. During energization (ie: ramping the coil by applying a voltage from a power supply to the terminals to drive a transport current), the inductive voltage developed by changing current in the spiral path will drive some of the power supply current into the radial path. The exact split in current can be calculated as known in the art. If the ramp rate is increased, more current flows in the radial path, causing more heating. In large coils, the maximum ramp rate will be set by the available cooling power, ie: the heating caused by radial current flow during ramping must not cause the coil temperature to increase so much that it become non-superconducting.

After ramping the power supply voltage drops to the level needed only to drive current through the residual resistance of the spiral path of magnet. The magnet then enters the "stabilisation phase", where the magnet is maintained at the operating current for sufficient time for the magnetic field to stabilise.

The instabilities in the magnetic field arise from parasitic currents induced in the magnet (in addition to the desired transport current), which each contribute towards the magnetic field of the magnet. These currents come in three types:

"Eddy currents", which are closed loops of current induced in non-superconducting ("normal") components.

"Coupling currents", which are closed loops of current induced in nearby superconducting components joined by a normal medium—these flow along one superconducting component, through the normal medium, and then along the other superconducting component and back through the normal medium to complete the loop.

"Screening currents", also known as "hysteresis currents", which are closed loops of current flow solely in the superconducting material.

The phrase "closed loop of current" means that the current flows entirely within the specified material(s), and does not start or terminate at the power supply or current leads.

In "steady state" applications, where the magnetic field of the magnet does not change quickly, the eddy currents and coupling currents will decay quickly (exponentially, with a time constant on the order of a few seconds), due to the resistance of the materials they travel through. However, screening currents will persist indefinitely, and change over long timescales (with a time constant on the order of minutes, hours, or even months). The screening currents also depend on the ramping history of the magnet—meaning that a magnet ramped up quickly will have different screening currents (and therefore a different magnetic field quality) to an identical magnet ramped up slowly, and that a magnet configured to produce 5 T which is ramped-up from a zero-current state will have different field quality to the same magnet ramped up from a previous steady 3 T state.

The magnetic field generated by a superconducting magnet therefore depends on its previous ramp history. It is possible to reset the magnet to a virgin state with no screening currents by raising its temperature above the superconducting transition temperature.

The effect of screening currents is particularly pronounced in HTS magnets using ReBCO or BSCCO tapes, as the large dimension of the superconducting filaments allows larger screening currents to form. The polluting magnetic "screening field" created by screening currents is a severe problem for application of existing HTS tape and coil technology in applications that demand high field homogeneity and stability, such as nuclear magnetic resonance (NMR) and magnetic resonance imaging (MRI).

There are a number of methods to reduce the impact of screening currents. The first is to ramp the magnet up and down in an oscillatory manner, with decreasing amplitude. This scrambles the screening current (ie: it creates many loops of current within each tape). The residual currents tend to cancel each other, reducing the net screening field pollution. A related method is to apply an oscillating magnetic field from a separate source (known as a "shaking field"). However, both methods are time consuming, complex, and residual screening field pollution still remains at a level that is too large for sensitive NMR measurements.

The current solution for coping with the residual screening current field is "shimming". The process of magnet shimming involves measuring the magnetic field deviation and then superimposing an equal and opposite correcting magnetic field. The source of the correction field may be either an independently energized coil or array of coils (either resistive or superconducting), or an array of magnetized elements, such as iron plates or permanent magnets. The former method is called "active" shimming, since the amplitude of the correction field can be adjusted by changing the current in the shim coil, while the latter is "passive" shimming, as the correction field is fixed and cannot be adjusted. The shimming process may need to be repeated several times over the life of the superconducting magnet, as the screening currents change over time.

The field produced by shielding currents, and their settling time, can also be reduced by damped oscillatory ramping algorithms. In this case the transport current is raised above the target value by a percentage X % (e.g. 10%), then reduced below the target value by a percentage Y %, where Y<X, (e.g. 8%), then raised above the target value by Z %, where Z<Y<X (e.g. 6%), and so on for a defined number of steps until the target value is reached. This method reduces the influence of shielding currents but does not eliminate them altogether. It also reduces the maximum attainable magnetic field, since the target current must be set below the lowest critical current value in the magnet. In some applications, such as particle accelerators, the field must be ramped unidirectionally, ruling out such field oscillations.

In general, an HTS magnet used for NMR or MRI will require a combination of all of the above corrective methods to achieve the magnetic field spatial homogeneity and temporal stability (collectively called "field quality").

Therefore there exists a need for a better method of reducing or ideally eliminating screening currents in an HTS magnet.

SUMMARY

According to a first aspect of the invention, there is provided a high temperature superconducting, HTS, magnet system. The HTS magnet system comprises an HTS field coil, a temperature control system, a power supply, and a controller. The HTS field coil comprises a plurality of turns comprising HTS material; and a resistive material electrically connecting the turns, such that current can be shared radially between turns via the resistive material. The temperature control system is configured to control the temperature of the coil, the temperature control system comprising at least a cryogenic cool system configured to keep the coil below a self-field critical temperature of the HTS material. The power supply is configured to supply current to the HTS field coil. The controller is configured to cause the power supply to provide a current greater than a critical current of all of the HTS material.

According to a second aspect, there is provided a method of operating a high temperature superconducting, HTS, field coil. The HTS field coil comprises a plurality of turns comprising HTS material, and a resistive material electrically connecting the turns, such that current can be shared radially between turns via the resistive material. Current is supplied to the HTS field coil such that a transport current of the HTS field coil is greater than a critical current of all of the HTS material. The temperature of the HTS field coil is controlled.

According to a third aspect, there is provided a method of determining the critical surface of a high temperature superconducting, HTS, conductor. The HTS conductor is formed into an HTS field coil comprising a plurality of turns comprising the HTS conductor; and a resistive material electrically connecting the turns, such that current can be shared radially between turns via the resistive material. The HTS field coil is operated with a transport current which is greater than the critical current of all of the HTS conductor. The temperature is measured at one or more points on the HTS field coil. The magnetic field produced by the field coil is measured. The critical surface of the HTS conductor is determined from said measurements.

According to a fourth aspect, there is provided a high temperature superconducting, HTS, magnet system. The HTS magnet system comprises a plurality of HTS field coils, a temperature control system, a power supply, and a controller. Each HTS field coil comprises a plurality of turns comprising HTS material; and a resistive material electrically connecting the turns, such that current can be shared radially between turns via the resistive material. The temperature control system is configured to control the temperature of each coil, the temperature control system comprising at least a cryogenic cool system configured to keep each coil below a self-field critical temperature of the HTS material. The power supply is configured to supply current to the HTS field coil. The controller is configured to:

- cause the power supply to provide a current to each field coil greater than a critical current of all of the HTS material in the HTS field coils;
- cause the temperature control system to adjust the temperature of each HTS coil and thereby adjust the contribution of each HTS coil to the magnetic field.

According to a fifth aspect of the present invention, there is provided a method of operating a high temperature superconducting, HTS, magnet system. The HTS magnet system comprises a plurality of HTS field coils, each comprising a plurality of turns comprising HTS material and a resistive material electrically connecting the turns, such that current can be shared radially between turns via the resistive material. Current is supplied to each of the HTS field coils such that a transport current of the HTS field coil is greater than a critical current of all of the HTS material. The HTS magnet system is controlled by controlling the temperature of each of the HTS field coils,

DETAILED DESCRIPTION

Figure 1:
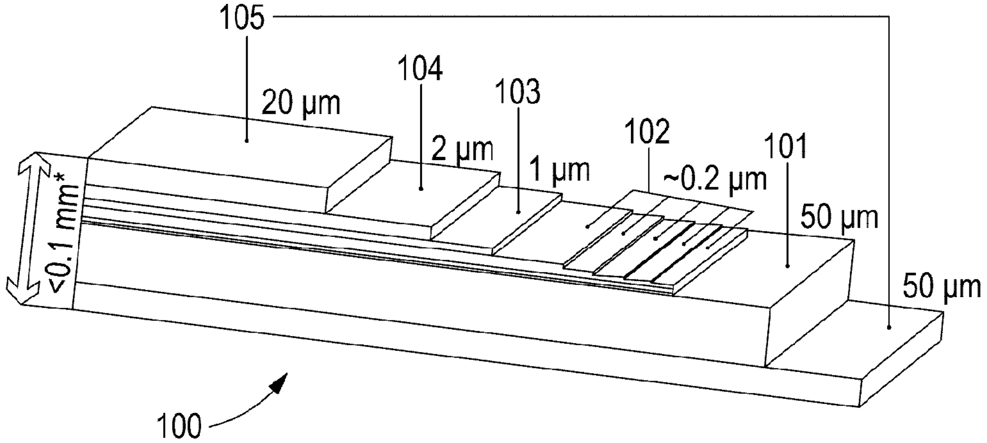
FIG. 1 is a schematic illustration of HTS tape.

Screening currents within an HTS magnet occur because the transport current, I, is less than the critical current $I_C$ of the conductor in large parts of the coil. The critical current $I_C$ is the maximum current which the HTS conductor can carry while superconducting, given the instantaneous environmental conditions (e.g. temperature, external magnetic field). The critical current varies across the magnet, because the magnetic field, temperature, and the HTS conductor itself will generally not be uniform. By contrast, the "peak critical current" of an HTS conductor is the current which that conductor can carry at a temperature of absolute zero, zero strain, and zero external magnetic field (i.e. in ideal conditions)—this is sometimes referred to simply as the "critical current" in the literature, but that meaning is not used here.

At present, superconducting magnets are operated such that the transport current is less than the minimum critical current in any part of the magnet coil, to prevent current leaking from the HTS conductor. This is done because any current leak from the HTS conductor will generate heat (as the current is now flowing through a resistive material), which will in turn locally raise the temperature of the HTS conductor, further reducing the critical current, and potentially starting a feedback cycle which may result in a quench (the HTS material heating to the point where it is no longer superconducting at the "hot spot", and the magnet dumping its energy into the non-superconducting region—often causing damage to the magnet unless mitigated). It is important to note that magnets made from coils would with multi-tape cables can operate stably with localized hot spots where current deviates around local defects in individual tapes.

The majority of the magnet will have an "operating fraction" (the ratio between the transport current and the critical current, $I/I_C$) less than unity, which provides "spare" current capacity in the HTS which becomes occupied either partially or fully by screening currents. Over time, if the transport current is kept steady, these will achieve equilibrium—but this typically happens over a very long time constant (on the order of minutes to months), in part because the screening currents are flowing through a zero resistance medium.

The proposal of the present disclosure is to operate an HTS magnet coil under a different regime—instead of the transport current being lower than the minimum critical current of the coil, the transport current is greater than the maximum critical current of the coil (for the entire period of operation). As a result, all of the superconducting material in the coil has an operating factor of unity, meaning that screening currents are excluded (there is no "spare" superconducting capacity). This state will herein be referred to as the "saturated" state. Conventional wisdom regarding HTS magnets would suggest that this is a terrible idea—all of the coil would in effect be one big hotspot, with current leaking into the resistive components of the magnet throughout the coil and causing the coil to heat up, requiring additional cooling for no practical benefit. However, it has been found to be possible if the turn-to-turn resistance is low enough, the thermal conductivity of the coil high enough and if sufficient cooling is provided to counteract the heating due to the current leak into the normal components. As a consequence several advantageous features result that enable a HTS magnet to operate without the influence of screening currents, with more uniform quench conditions (forces and temperatures), producing the maximum possible field from the conductor, and with a simple control mechanism.

The new operating mode is only possible in partially insulated (or non-insulated) coils. When current in a partially insulated coil leaves the HTS conductor, it will initially flow in a spiral path parallel to the HTS through the resistive components of the magnet (i.e. the stabiliser layers of the HTS tape, and any resistive components connecting the turns). However, this spiral path flow will decay quickly into the radial path (i.e. flowing radially through the resistive components) due to the high resistance of the non-superconducting spiral path. This means that, when operating with an in the saturated regime, the magnetic field produced by a coil is dependent only on the shape of the coil and the critical current of the HTS within the coil—as the radial current flow through the resistive components will not make a significant contribution to the magnetic field.

The critical current of the HTS is, in turn, dependent on:
- the temperature of the HTS;
- the external magnetic field (i.e. magnetic field not due to the current in the HTS) at the HTS;
- the strain on the HTS.

All of these factors will vary though the coil.

For a magnet isolated from other variable magnetic field sources, the external magnetic field on each turn of the coil will be dependent only on the magnetic field produced by each other turn, and if the magnet is also isolated from other variable sources of strain, then the strain on the tape is only dependent on strains which are a result of the magnetic field produced by the magnet.

Figure 2:
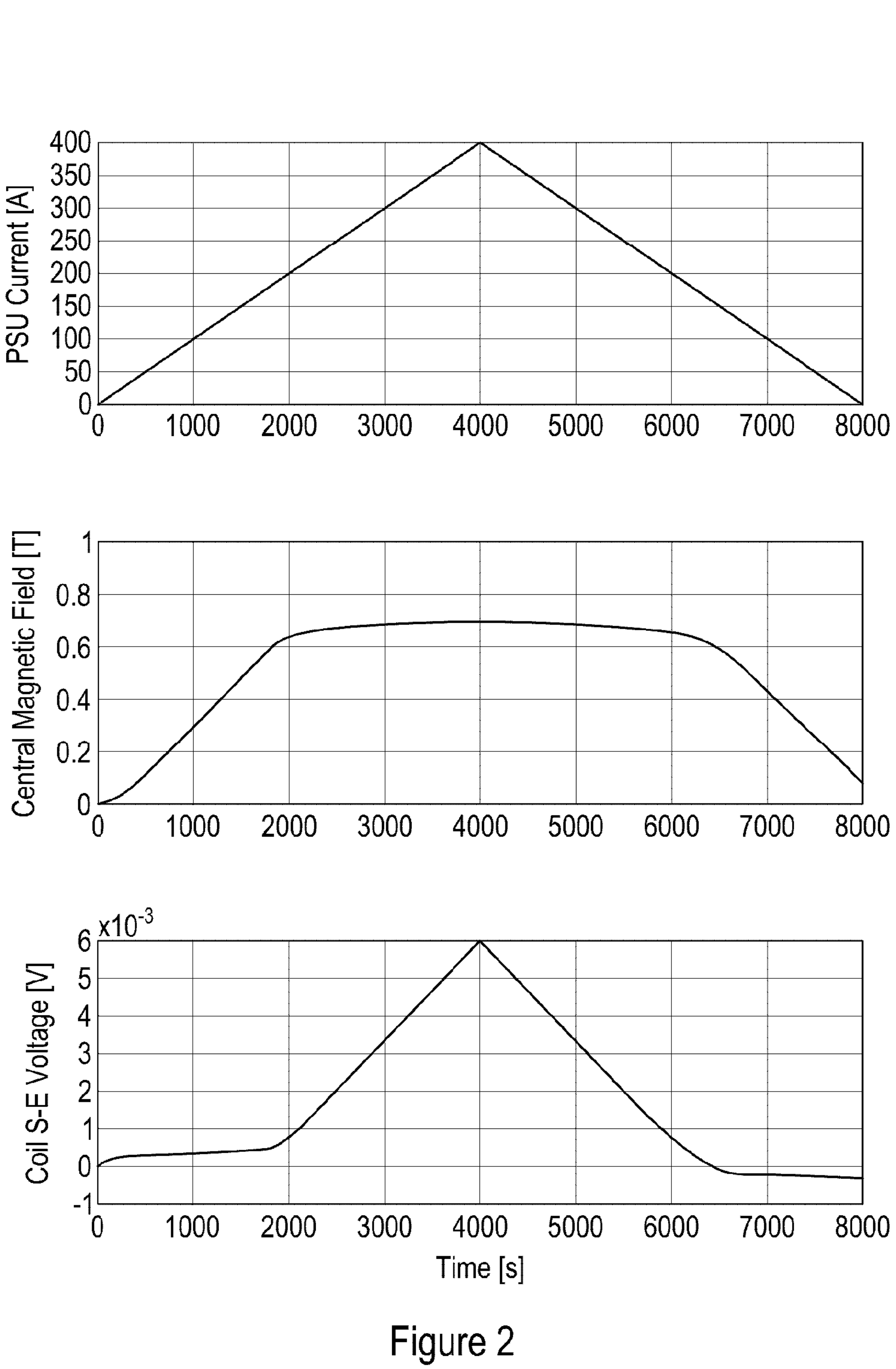
FIG. 2 shows the results of a ramp-up test on a partially insulated HTS coil maintained at 77 K.

FIG. 2 illustrates the behaviour of a small non-insulated pancake coil wound using a pair of tapes with all turns soldered together when it is ramped into the unity operating fraction regime, with the temperature maintained at 77K by a liquid nitrogen bath. The power supply unit (PSU) current (top graph) is ramped from 0 to 400 A, and when it hits approximately 200 A the HTS of the coil becomes saturated—the central magnetic field (middle) levels off, and the voltage across the coil (bottom) begins to rise with the PSU current. The central magnetic field remains approximately constant during the rest of the ramp-up, and during the subsequent ramp-down, until the transport current falls below approximately 200 A and the coil is no longer saturated.

Figure 3:
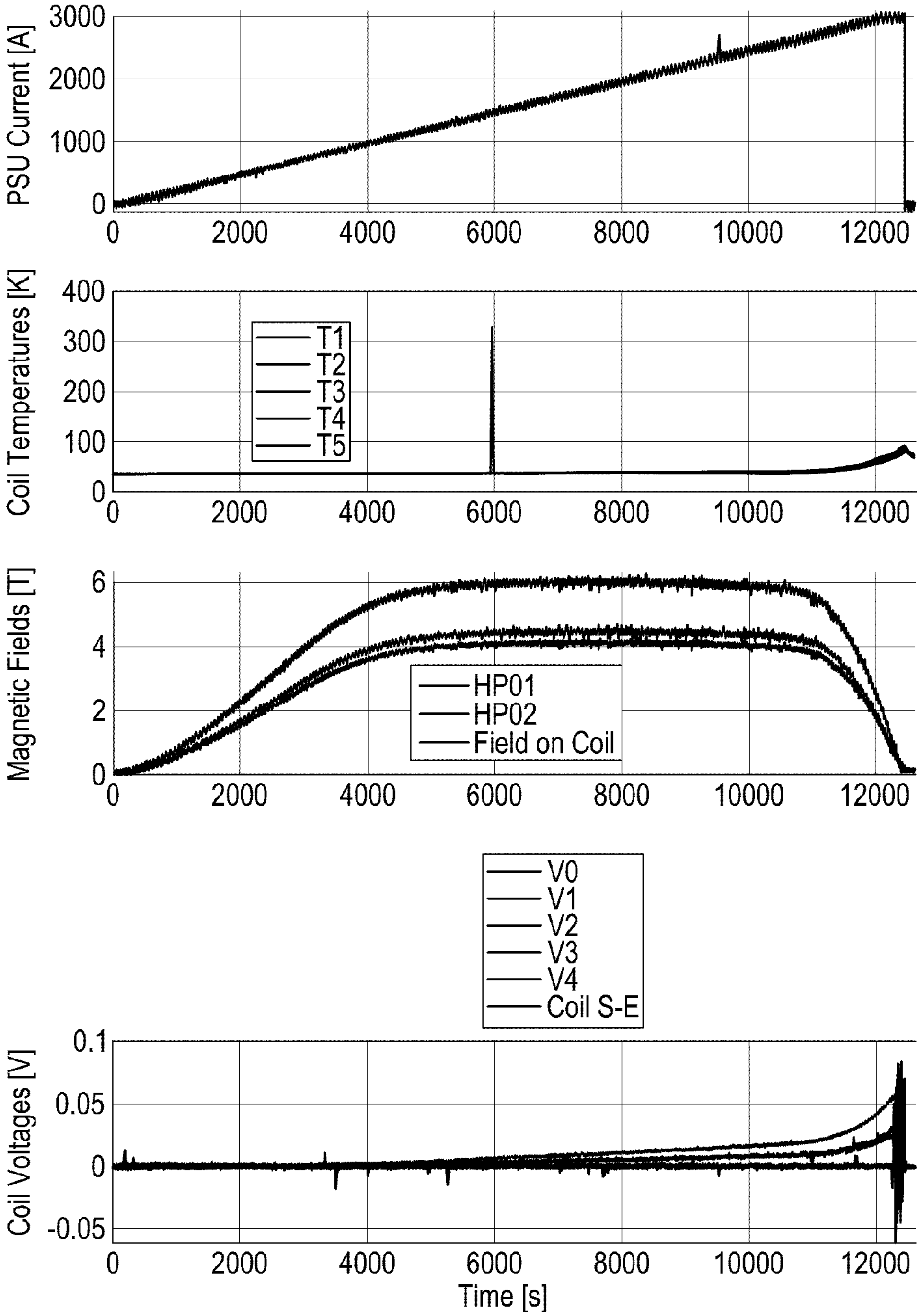
FIG. 3 shows the results of a ramp-up test on a partially insulated HTS coil maintained at 40K.

FIG. 3 shows the results of a similar test performed on a magnet comprising a pair of pancake coils coil that is conduction cooled with a cryocooler, and controlled with a temperature control system configured to maintain the coil temperature at 40K. The magnetic field of the coil increases during the ramp up, until a current of approx 1.1 kA is reached. Above this, the magnetic field remains approximately steady, until the PSU current exceeds about 2.6 kA, at which stage the temperature control system is overwhelmed by the excess heat caused by the radial current leak. The coil's temperature increases gradually, causing the critical current of the coil to diminish, and the magnetic field produced by the coil to diminish. This occurs in a steady manner over ~1000 s until the self-field critical temperature of the coil is reached and the magnetic field has reached zero. The power supply is then turned off.

Figure 4:
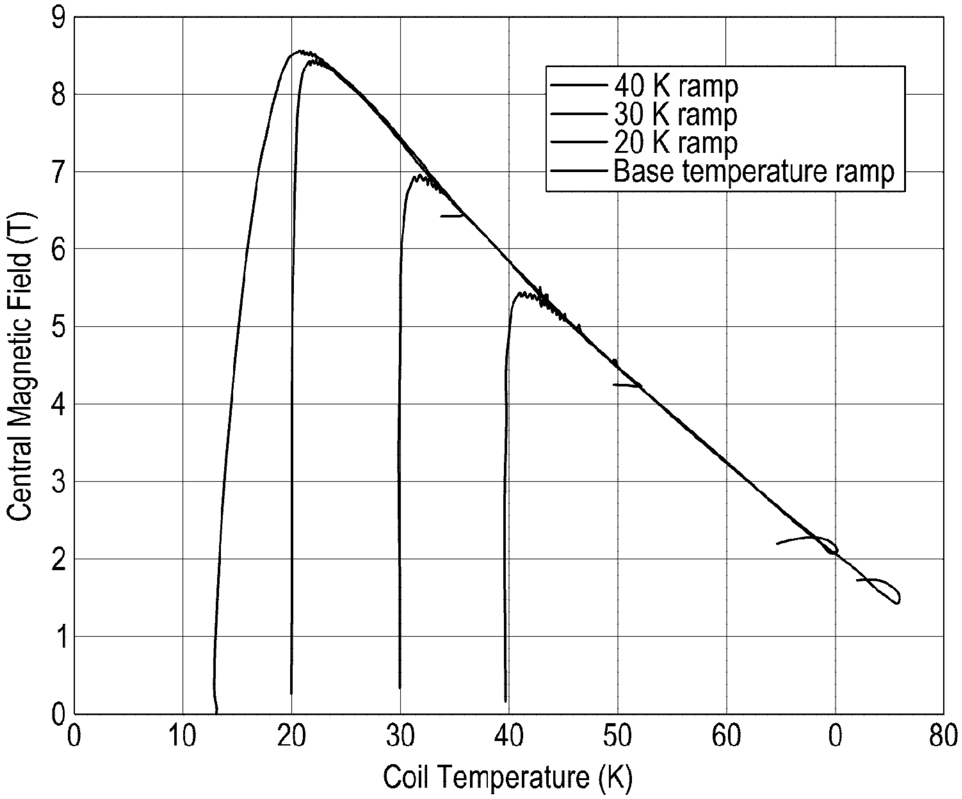
FIG. 4 shows the results of ramp-up tests performed on an HTS coil at a variety of starting temperatures.

FIG. 4 shows plots of several ramps of the same magnet with a temperature control system configured to maintain the coils respectively at base temperature (heater turned off), 20 K, 30 K, and 40 K until the coils saturate (at which point they heat up under the excess current provided by the power supply, which continues to ramp up). The ramp-up is shown in the central magnetic field—coil temperature (B-T) plot. In each case, the ramp begins at low magnetic field (bottom of the substantially vertical line), and magnetic field increases as the transport current increases, while remaining below the critical current of the HTS. In the upper portion of the graph, the transport current is beginning to saturate the HTS, and the magnetic field "rolls over" as the coil enters the saturated regime. In this regime, each of the tests shown follows the same B-T relationship between central magnetic field (B) and coil temperature (T), regardless of the ramping history of the coil and the exact value of the current supplied (the "loops" at the right hand extreme of each graph are artefacts resulting from the end of the test). This lack of any hysteresis effect arises because the central magnetic field is determined solely by the critical current of the HTS in the coil, with no interference from screening currents which would be present in a typical scenario.

The temperature will tend to vary through the magnet—e.g. regions with lower critical current will experience more current passing through the nearby resistive material, and hence more heating, and the cooling will depend on the heat conductance of the materials forming the coil and the layout of the cooling system, but this pattern will generally result in a consistent temperature profile.

If a characteristic temperature is chosen to represent the temperature profile throughout the magnet (e.g. the temperature at a specific point on the magnet, or an average of the temperature at several such points), then it can be shown (and demonstrated experimentally, see FIG. 4) that the field produced by a magnet in the saturated regime depends only on this temperature.

While the HTS material remains superconducting throughout the magnet (i.e. the minimum critical current of the HTS does not drop to 0), the relationship between the characteristic temperature and the magnetic field strength is such that an increase in temperature results in a decrease in magnetic field, as shown in FIG. 4.

When operating in saturated mode the field of the HTS magnet can be decreased monotonically by warming the coil from low temperature (maximum field) towards the critical temperature of the magnet (zero field). The field sweep rate, dB/dt, is set by the rate of warming, $dT_{magnet}/dt$. Under this condition, the field can be changed quicker than the magnet's electromagnetic time constant, $\tau=L/R$, where L is the inductance of the magnet and R is the radial resistance, which is often prohibitively long. In this regime the stored energy of the magnet is dissipated as heat in the coil, and the maximum field sweep rate permitted is determined entirely by thermal design (i.e. how quickly the temperature can be changed). Similarly, accelerated field sweep rates can be achieved for a monotonic increase of the magnetic field, by rapidly cooling the magnet and simultaneously providing surplus power supply current so that the magnet remains in the saturated regime.

There are no screening currents in the coil when operating in this regime, so the only delays in changing the magnetic field are the time taken for the magnet to heat up or cool down, and the time taken for currents in the resistive spiral path to decay into the radial path. Both of these are parameters that can be controlled by appropriate thermal and electrical coil designs, and in the examples shown have a timescale of tens of minutes at 20 K.

The magnet can therefore be controlled by monitoring either a characteristic temperature of the magnet or monitoring the magnetic field directly, and heating or cooling the magnet to achieve the desired magnetic field. Heating the magnet will reduce the critical current of the HTS, and hence the magnetic field strength, and cooling the magnet will increase the critical current of the HTS, and hence the magnetic field strength.

Where only the temperature is monitored, the relationship between the characteristic temperature and the magnetic field may be determined based on a pre-calibrated lookup table or formula. It will be appreciated that the control of the magnet is equivalent whether this is used to relate the measured temperature to the instantaneous magnetic field, and determine the difference between the instantaneous and desired magnetic field, or to relate the desired magnetic field to a desired temperature, and determine the difference between the desired and measured temperatures.

Heating of the magnet may be achieved by increasing the transport current (thereby causing more current to enter the resistive portions of the magnet), by the use of dedicated heaters provided in thermal contact with the coils, or by reducing the cooling (e.g. flow rate) provided by the cryogenic cooling system of the magnet. Cooling of the magnet may be achieved by increasing the cooling of the cryogenic cooling system, or by reducing the transport current (while still remaining in the saturated range) or the power supplied to heaters.

In the first case mentioned above (heating the magnet by increasing the transport current), it will be noted the outcome is highly non-intuitive, ie: to increase the magnetic field one would reduce the power supply current, and vice versa. This is only the case when the magnet is being operated in the saturated regime.

A feedback system is implemented to control the measured temperature/field by heating and cooling—i.e. when the measured temperature is too high, or the measured field too low, then the magnet is cooled down (or the heat applied is reduced), and when the measured temperature is too low, or the field too high, then the magnet is heated up (or the cooling applied is reduced). Any suitable feedback scheme as known in the art may be used for this purpose.

When operating with magnetic field monitoring, the control scheme outlined above may be used even in situations where the external strain and/or magnetic field on the magnet is variable. This could also be done with temperature monitoring if strain and/or field sensors were included, and the lookup table or formula contained terms to account for the effects of strain and/or field. Alternatively (in either the constant or variable background field case), a lookup table between temperature and desired field could be used to obtain an initial estimate for the heating required, and then a feedback loop based on the monitored magnetic field used to reach the desired magnetic field.

When operating in the saturated regime, field stability is determined only by the stability of the critical current of the HTS—i.e. by the stability of the external magnetic field, strain, and temperature.

For multi-coil systems the same principle applies—each individual coil can be operated in saturated mode. Furthermore, it is possible to control the homogeneity of the magnetic field by independently controlling the temperature of each individual coil, based on spatially distributed measurements of the magnetic field. The control feedback loop will be more complicated—an array of sensors should be positioned in a way that allows the homogeneity of the magnetic field produced by all coils to be determined, and the temperature of each coil can then be individually controlled to adjust the field homogeneity by adjusting the field contributed by each individual coil. The shape of the magnetic field can conveniently be described using a weighted sum of spatial harmonics, such as Legendre polynomials, as described in the prior art of shimming. However, many other ways to determine the field homogeneity exist.

It should be noted that to adjust the field homogeneity for a set of coils connected in series it is necessary to adjust the contribution of each coil independently. This cannot be done by adjusting the transport current, which affects the temperature of all coils operating in saturated mode. It is therefore necessary to adjust the temperature of each coil independently. The coils therefore need to be at least partially thermally isolated from each other. Their temperatures can then be adjusted either by controlling the cooling of each coil or adding additional heating to each coil, for example, with a heater.

Alternatively, the magnet may have a mix of coils operated in the conventional regime and coils operated in the saturated regime, with the latter adjusted to ensure field homogeneity.

While the above refers to field homogeneity, it will be appreciated that other field profiles can be achieved by adjustment of the magnet coils, where needed.

The saturated regime also provides a convenient way to test the quality of HTS tape—for a given coil temperature, environment, and coil geometry, the magnetic field is entirely determined by the critical current of the HTS tape—so an HTS tape can be tested by measuring the magnetic field produced by a coil of that tape running in the saturated regime at different temperatures, and determining the critical current response. The magnetic field provides a measure of the integrated critical current density of the tape throughout the coil—and further magnetic field sensors can be used to determine how the critical current varies through the coil, and hence obtain the critical surface of the HTS tape (a profile of the temperature and/or magnetic field variance of critical current in the tape). Operating in the saturated regime with HTS of unknown critical current would either require first determining an estimate or upper limit for the critical current, or simply supplying a very high transport current such that it is unlikely that the critical current is below the transport current. Alternatively, the coil transport current can be ramped up until the temperature/magnetic field relationship characteristic of the saturated regime is observed (i.e. the "roll over" shown in FIG. 4), and then measurements are taken as the coil's temperature is raised towards the self-field critical temperature to determine the integrated critical current and/or critical surface (i.e. the variation of the critical current with temperature, field, and strain).

Operating at saturation will increase the likelihood of a quench compared to operating in the conventional regime—if the cooling system is not able to counteract the additional heating from the current flow in the resistive material in any part of the magnet, then a thermal runaway may occur. However, since all of the HTS will be operating at saturation, it will all be equally susceptible to thermal runaway (i.e the thermal margin is uniform). This means that any quench will propagate quickly, causing the energy of the magnet to be dumped throughout the volume of the magnet. This will cause significantly less damage than a quench in a conventionally operating HTS magnet, where a hotspot will tend to be only a small portion of the magnet, into which all of the magnet's stored energy is then dumped unless countermeasures are taken. The minimum quench energy would still be much higher for a saturated HTS magnet than for an equivalent LTS magnet, allowing an HTS magnet to be operated with many of the advantages of HTS while also having the resilience during quenches of an LTS magnet. In summary, quenches are more likely in the new regime, but damage from quenches is less likely.

The new regime applies to any non-insulated or partially insulated coil. The performance of a coil in the new regime may be optimised by providing material between the turns with high electrical and thermal conductivity (to reduce heating from excess current, and increase the ability to transport that heat to the cooling system), but these are not strictly necessary—it would be equally valid to run a coil with lower electrical and thermal conductivity in the saturated regime, and provide additional cooling power to ensure that the coil does not quench. This would cause a temperature gradient across the coil—but as noted previously this does not change the predictability of the temperature/magnetic field relationship provided a representative temperature is chosen for the temperature profile of the coil.

Figure 5:
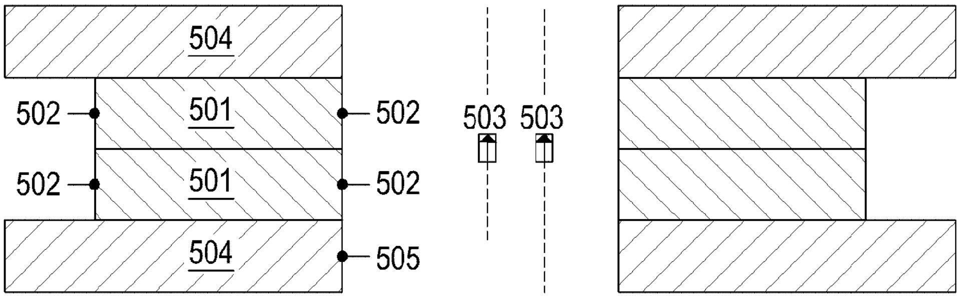
FIG. 5 is a schematic illustration of an exemplary HTS magnet system.

FIG. 5 shows an exemplary HTS magnet system using the above described control scheme. The system comprises two partially insulated coils 501, formed into a double pancake coil, each of which is monitored by temperature sensors 502 and magnetic field sensors 503. Cooling plates 504 are provided on the side of the double pancake, to ensure good heat conduction from the HTS coils, and a heater 505 is provided to heat the coils. The HTS magnet system has a power supply (not shown) which provides a transport current to the HTS coils, and a controller (not shown) which receives input from the temperature sensors 502 and magnetic field sensors 503, and adjusts the magnetic field strength of the magnet by controlling the temperature using the heater 505, and by adjusting the PSU current (while keeping the magnet in the saturated regime).

The invention claimed is:

1. A high temperature superconducting, HTS, magnet system comprising:
- an HTS field coil comprising:
  - a plurality of turns comprising HTS material;
  - a resistive material electrically connecting the turns, such that current can be shared radially between turns via the resistive material;
- a temperature control system configured to control the temperature of the coil, the temperature control system comprising at least a cryogenic cooling system configured to keep the temperature of the coil below a self-field critical temperature of the HTS material;
- a power supply configured to supply a transport current to the HTS field coil;
- a controller configured to:
  - cause the power supply to provide the transport current greater than a critical current of all of the HTS material;
  - cause the temperature control system to adjust the temperature of the HTS field coil in order to adjust the magnetic field strength of the HTS field coil.

2. An HTS magnet system according to claim 1, and comprising:
- a sensor configured to measure a temperature of the coil and/or a magnetic field produced by the coil;
- wherein causing the temperature control system to adjust the temperature of the HTS field coil in order to adjust the magnetic field strength of the HTS field coil comprises
- adjust the magnetic field strength of the coil by:
  - monitoring readings from the sensor in order to determine a magnetic field strength of the coil;
  - causing the temperature control system to lower the temperature of the coil in the case that the measured magnetic field strength of the coil is less than a desired magnetic field strength of the coil, and to raise the temperature of the coil in the case that the measured magnetic field strength of the coil is greater than the desired magnetic field strength of the coil.

3. An HTS magnet system according to claim 2, wherein the temperature control system comprises the power supply, and is configured to increase the temperature of the HTS field coil by increasing the current supplied to the HTS field coil, and to decrease the temperature of the HTS field coil by decreasing the current supplied to the HTS field coil, such that the supplied current remains greater than the critical current of all of the HTS material.

4. An HTS magnet system according to claim 2, wherein the temperature control system comprises a heater in thermal contact with the HTS field coil.

5. A method of operating a high temperature superconducting, HTS, field coil, the HTS field coil comprising a plurality of turns comprising HTS material, and a resistive material electrically connecting the turns, such that current can be shared radially between turns via the resistive material; the method comprising:
- supplying a transport current to the HTS field coil such that the transport current is greater than a critical current of all of the HTS material;
- adjusting the temperature of the HTS field coil in order to adjust the magnetic field strength of the HTS coil, keeping the temperature below a self-field critical temperature of the HTS material.

6. A method according to claim 5, further comprising;
- monitoring one of:
  - a temperature of the HTS field coil;
  - a magnetic field produced by the HTS field coil;
- wherein controlling the temperature of the HTS field coil in order to adjust the magnetic field strength of the HTS coil comprises:
  - determining a magnetic field strength of the coil from results of said monitoring;
  - decreasing the temperature of the coil when the measured magnetic field strength is less than a desired field strength of the HTS coil;
  - increasing the temperature of the coil when the measured magnetic field strength is greater than a desired field strength of the HTS coil.

7. A method according to claim 6, wherein increasing the temperature of the HTS field coil comprises one or more of:
- increasing power supplied to a heater in thermal contact with the HTS field coil;
- decreasing cooling provided by a cooling system of the HTS field coil; and
- increasing the current supplied to the HTS field coil.

8. A method according to claim 6, wherein decreasing the temperature of the HTS field coil comprises one or more of:
- decreasing power supplied to a heater in thermal contact with the HTS field coil;
- increasing cooling provided by a cooling system of the HTS field coil; and
- decreasing the current supplied to the HTS field coil, such that the current remains greater than the critical current of the HTS material in all of the HTS material.

9. An HTS magnet system comprising:
- an HTS field coil comprising:
  - a plurality of turns comprising HTS material;
  - a resistive material electrically connecting the turns, such that current can be shared radially between turns via the resistive material;
- a temperature control system comprising a cooling system configured to keep the temperature of the HTS field coil below a self-field critical temperature of the HTS material;
- a power supply configured to supply current to the HTS field coil; and
- a controller configured to:
  - cause the power supply to provide current sufficiently high to saturate the HTS material in the coil so that it all operates at its critical current;

reduce the magnetic field generated by the HTS field coil by increasing the current supplied by the power supply, and increase the magnetic field generated by the HTS field coil by decreasing the current supplied by the power supply.

10. A high temperature superconducting, HTS, magnet system comprising:

a plurality of HTS field coils, each comprising:

a plurality of turns comprising HTS material;

a resistive material electrically connecting the turns, such that current can be shared radially between turns via the resistive material;

a temperature control system configured to control the temperature of each coil, the temperature control system comprising at least a cryogenic cool system configured to keep each coil below a self-field critical temperature of the HTS material;

a power supply configured to supply current to the HTS field coil;

a controller configured to:

cause the power supply to provide a current to each field coil such that a transport current of each HTS field coil is greater than a critical current of all of the HTS material in the HTS field coil;

cause the temperature control system to adjust the temperature of each HTS coil and thereby adjust the contribution of each HTS coil to the magnetic field.

11. A magnet system according to claim 10, and comprising a magnetic field sensor array configured to measure a magnetic field produced by the plurality of HTS field coils; wherein the controller is further configured to:

determine a magnetic field profile of the HTS magnet system from the measured magnetic field;

cause the temperature control system to adjust the temperature of each HTS coil in order to achieve a desired magnetic field profile.

12. A magnet system according to claim 10, wherein the power supply is configured to supply the same current to each HTS field coil, and wherein the controller is configured to adjust the temperature of all of the coils by adjusting the power supply current, while keeping the current greater than the critical current of all of the HTS material in all of the HTS field coils.

13. A magnet system according to claim 10, wherein the temperature control system comprises a heater for each HTS field coil, and wherein the temperature control system is configured to adjust the temperature of each of the HTS field coils individually by controlling the heat provided to the respective coil by each heater.

14. A method of operating a high temperature superconducting, HTS, magnet system, the HTS magnet system comprising a plurality of HTS field coils, each comprising a plurality of turns comprising HTS material and a resistive material electrically connecting the turns, such that current can be shared radially between turns via the resistive material, the method comprising:

supplying current to each of the HTS field coils such that a transport current of each HTS field coil is greater than a critical current of all of the HTS material in the HTS field coil;

keeping the temperature of each of the HTS field coils below a self-field critical temperature of the HTS material;

adjusting the temperature of each HTS coil and thereby adjusting the contribution of each HTS coil to the magnetic field.

15. A method according to claim 14, and comprising:

monitoring a magnetic field produced by the HTS magnet system;

adjusting the temperature of each HTS field coil in order to achieve a desired magnetic field profile.

16. A method according to claim 14, wherein the same current is supplied to all of the HTS field coils, and adjusting the temperature of each of the HTS field coils comprises adjusting the temperature of all of the HTS field coils by adjusting the supplied current.

17. A method according to claim 14, wherein adjusting the temperature of each of the HTS field coils comprises controlling power supplied to a respective heater in thermal contact with each HTS field coil.

* * * * *